US008596296B2

(12) United States Patent
Rasmussen

(10) Patent No.: US 8,596,296 B2
(45) Date of Patent: Dec. 3, 2013

(54) REGULATION VALVE

(75) Inventor: Christian Bo Rasmussen, Odense M. (DK)

(73) Assignee: Broen A/S, Assens (DK)

( * ) Notice: Subject to any disclaimer, the term of this patent is extended or adjusted under 35 U.S.C. 154(b) by 395 days.

(21) Appl. No.: 12/989,734

(22) PCT Filed: Apr. 30, 2009

(86) PCT No.: PCT/DK2009/050102
§ 371 (c)(1),
(2), (4) Date: Oct. 26, 2010

(87) PCT Pub. No.: WO2009/132658
PCT Pub. Date: Nov. 5, 2009

(65) Prior Publication Data
US 2011/0186147 A1  Aug. 4, 2011

(30) Foreign Application Priority Data

Apr. 30, 2008  (DK) .................................. 2008 00611

(51) Int. Cl.
*F16K 1/32* (2006.01)
(52) U.S. Cl.
USPC ................. 137/613; 137/315.04; 137/315.11; 137/552
(58) Field of Classification Search
USPC ..................... 137/315.04, 501, 637.2, 315.11, 137/505.25, 613, 551, 552
See application file for complete search history.

(56) References Cited

U.S. PATENT DOCUMENTS

| 5,566,711 | A | * | 10/1996 | Glansk et al. ................. 137/557 |
| 5,584,467 | A | * | 12/1996 | Harnett et al. ............ 251/129.07 |
| 6,230,734 | B1 | * | 5/2001 | Grebnev et al. ............... 137/220 |
| 7,080,655 | B2 | * | 7/2006 | Jacksier et al. ........... 137/505.25 |
| 7,174,915 | B2 | * | 2/2007 | Fazekas ........................ 137/613 |
| 7,434,593 | B2 | * | 10/2008 | Noll et al. ..................... 137/613 |
| 7,735,514 | B2 | * | 6/2010 | Marstorp et al. .............. 137/501 |

FOREIGN PATENT DOCUMENTS

| DE | 21 10 149 A1 | 9/1972 |
| EP | 0 653 582 A1 | 5/1995 |
| WO | 2005/088263 A1 | 9/2005 |
| WO | 2006/031161 A1 | 3/2006 |

* cited by examiner

*Primary Examiner* — Kevin Lee
(74) *Attorney, Agent, or Firm* — Robers Mlotkowski; Safran & Cole, P.C.; David S. Safran

(57) ABSTRACT

A regulating valve of the type preferably used for dynamic regulation of fluid-borne systems, such as central heating systems in housing and industrial buildings or cooling facilities, where the control valve is provided with a valve housing with an inlet and an outlet, where a valve insert with an orifice is provided in the valve housing by which the flow in the regulating valve can be regulated, and where additionally there are detectors for detecting either supply pressure or discharge pressure and another pressure, respectively. The regulating valve is provided with a modular valve insert which at least includes a differential pressure regulator, a venturi, a throttle device and a coupling member for an actuator, where the various modules have interacting joining means. A valve insert may thus be built up of respective modules, where the modules are selected individually with the most suitable specifications for the individual task. It is thus not required to make as many different combinations of valve inserts since they are combined modularly according to need.

8 Claims, 2 Drawing Sheets

REGULATION VALVE

FIELD OF THE INVENTION

The present invention concerns a regulating valve of the type preferably used for dynamic regulation of fluid-borne systems, such as central heating systems in housing and industrial buildings or cooling facilities, where the control valve is provided with a valve housing with an inlet and an outlet, where a valve insert with an orifice means is provided in the valve housing by which the flow in the regulating valve can be regulated, and where additionally there are detecting means for detecting either supply pressure or discharge pressure and another pressure, respectively.

BACKGROUND OF THE INVENTION

It is commonly known to use regulating valves of the type mentioned in the introduction. These are used for regulating many different conditions, including those in central heating systems.

The prior art types of regulating valves which e.g. are known from WO 2006/031161 are provided with a difference pressure regulator and with detection means for detecting pressure at each side of the differential pressure regulator. By measuring the differential pressure across the valve, it is determined whether the differential pressure required for operating is available to the valve or not. The desired flow may be set based on a scale on the valve, but no flow measurement verifies the actual flow, which is then to provided by an extra valve, a measuring orifice or by ultrasonic measuring equipment.

Another inexpediency of the prior art types of regulating valves is that they are difficult to identify, particularly after being mounted. It is common that the valves are fitted with a small data plate which, however, tends to disappear or become unreadable over time. Thus it becomes particularly difficult during fault localisation to find the specifications of the different valves such that the proper valve may be replaced by a corresponding valve or regulation may be performed on the right valve.

OBJECT OF THE INVENTION

It is the purpose of the invention to indicate a regulating valve which is made up of standard components, where continuous flow measurement is enabled and where unambiguous identification is readily provided.

DESCRIPTION OF THE INVENTION

The invention concerns a regulating valve of the type mentioned in the introduction, wherein the valve insert is modular and is thus at least including a differential pressure regulator, a venturi, a throttle device and a coupling member for an actuator, where the various modules are made with interacting joining means, preferably with snap-action joints.

By such a valve insert there is achieved the possibility of making a valve insert with exactly the wanted specifications. A valve insert may thus be built up of respective modules, where the modules are selected individually with the specifications most suited for the individual task. It is thus not required to make as many different combinations of valve inserts since they are combined modularly according to need.

A particularly preferred variant of the invention is where the valve housing of the regulating valve is provided with an inlet communicating with more than one opening in the valve insert, where these openings preferably—but not necessarily—are evenly distributed around the periphery of the valve insert. Thereby, a markedly increased capacity and markedly less turbulence in the valve insert are achieved. This is due to the fact that the at least two flows meet at the centre of the valve insert and are more easily conducted through the insert thereby. This variant is particularly suited for a regulating valve like this where the fluid flow is to be led into a venturi. By arranging recesses and/or openings in the valve insert, the same standard valve housing can be used for many different regulating valves. Thus are achieved even more advantages in that the valve insert is modularly designed.

In a further preferred variant of a regulating valve according to the invention, the orifice in the regulating valve is provided with a pre-settable opening by which the maximum flow in the orifice is regulated. It is thus actually a fixed setting of the maximum flow capacity. By using this additional orifice device, it is possible to adapt the regulating valve to many different capacity demands.

In order to achieve high accuracy during the continual flow measurement, the venturi in the valve insert is provided with one or more openings that communicate with detecting means for detecting a fluid pressure. By measuring the pressure at this position and comparing the measured value with a pressure measured at the inlet, a high measuring accuracy is achieved as there is a large pressure drop in the venturi compared with in front of or behind the venturi, meaning that we are speaking of a wide measuring range which enables exact setting and verification of actual flow.

A regulating valve according to the invention may advantageously be with a valve insert which is mainly made of one or more different plastic materials, for example Polyphenylene Sulfide (PPS) or Polyphthalamide (PPA). These may thus adapted to the specific demands to the strength and resistibility of the particular modules, and to other similar conditions. Furthermore, there is achieved a saving of costs by making these in a plastic material, as compared with brass or the like.

A particular advantage of a regulating valve according to the invention is that the various modules with specific properties in the valve insert are provided with each their unambiguous identification, preferably with a colour code and/or with an RFID-tag. During production, different elements with different properties are therefore easily identified. For example, differential pressure regulators may be produced with different characteristics which very easily may be determined by a colour code. An assembled valve insert may e.g. thus be with a blue differential pressure regulator, a red venturi, a green orifice and a yellow coupling member for an actuator. These visual identification means are particularly suited during the building up of the valve insert as well as during assembly of the regulating valve itself.

When the valve is assembled and possibly mounted in a pipe system, an RFID-tag, which possibly is embedded in the individual modules or in one of these or alternatively mounted in the valve housing itself, be a very smart way of identifying specific data for the regulating valve in question. Other types of electronic marking and tracking systems may obviously be applied too.

DESCRIPTION OF THE DRAWING

An embodiment of the invention is described in detail in the following with reference to the drawing, wherein.

DETAILED DESCRIPTION OF THE INVENTION

Figure 1:
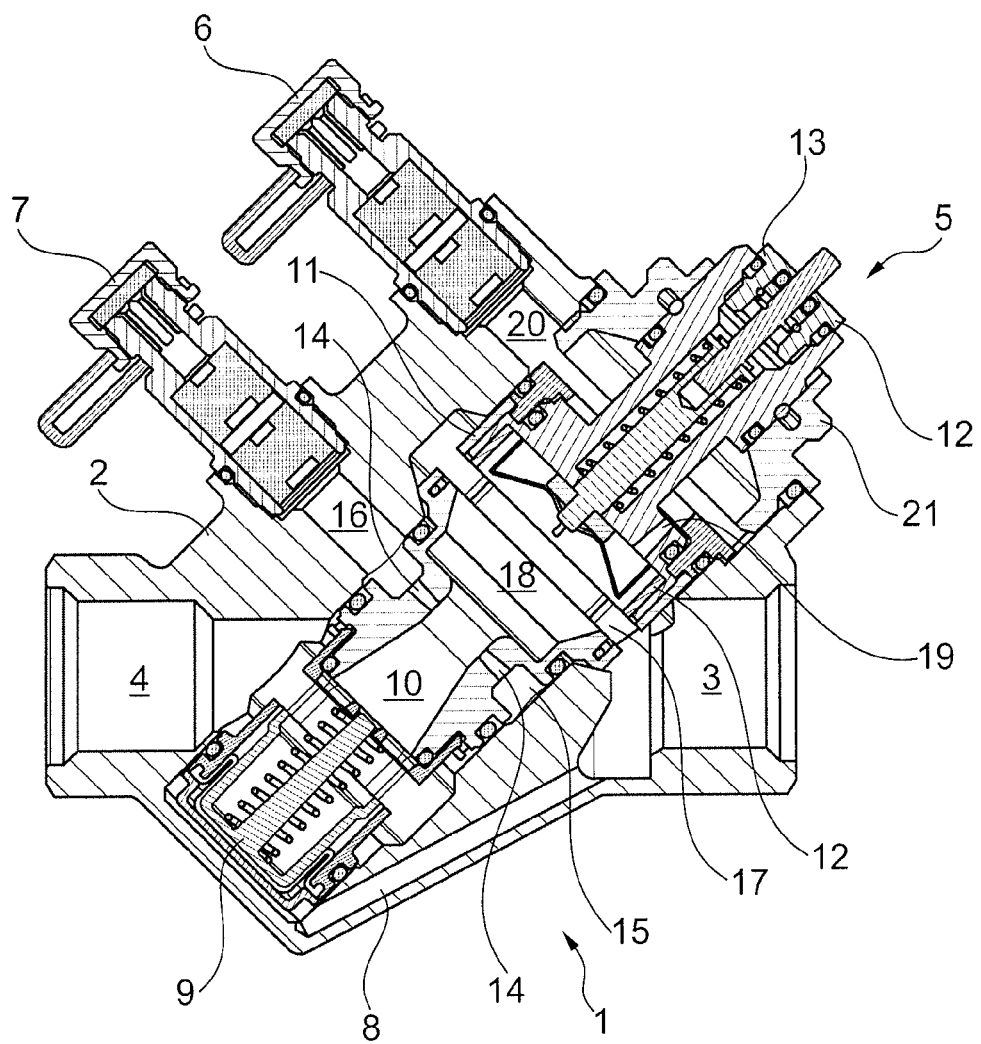
FIG. 1 shows a regulating valve in cross-section.

An embodiment of the invention is described below where the following reference numbers are used:
1 Regulating Valve
2 valve housing
3 supply opening
4 discharge opening
5 valve insert
6 pressure sensor
7 pressure sensor
8 duct
9 differential pressure regulator
10 venturi
11 regulating damper
12 orifice
13 coupling member
14 two ducts
15 surrounding recess
16 boring in valve housing
17 slot
18 chamber before venturi
19 hole for chamber
20 boring in valve housing
21 nut In FIG. 1 a regulating valve 1 according to the invention appears in cross-section. The regulating valve 1 consists of a valve housing 2 with an supply opening 3 and a discharge opening 4; the flow then runs from the right to the left on FIG. 1. Coupling sleeves are provided at the supply opening 3 and the discharge opening 4 for mounting on not shown pipe connections. The modular valve insert 5 appears at the centre of the regulating valve 1. Furthermore, two pressure sensors 6 and 7 detecting the pressure at respective points in the regulating valve 1 are seen. Moreover, there is seen a duct 8 that extends from the supply opening 3 and to the bottom of the central boring in which the valve insert 5 is mounted.

Furthermore, the following modules appear in the valve insert: A differential pressure regulator 9, a venturi 10, a regulating damper 11, an orifice 12 and a coupling member 13 for a not shown actuator. At the venturi 10 appear two ducts 14 that connect the interior of the venturi with a surrounding recess 15 to which the pressure sensor 7 is connected via boring 16 in the valve housing 2. At the top of the valve insert 5 is seen the coupling member 13 which is closely connected to a part of the orifice 12 which extends upwards and in which the coupling member 13 is mounted. By turning the orifice 12 about its longitudinal axis, setting of the maximum flow through the regulating valve 1 is achieved. The orifice 12 is here made with a cylindric part in which there is a slot 17 which, depending on how the orifice 12 is turned, can be more or less open. Inside the cylindric part of the orifice 12 there is a regulating damper 11 which under action the not shown actuator is moved along the longitudinal axis in an upwards or downwards movement. Thus the instantaneous flow in the regulating valve 1 is regulated in that the regulating damper is moved in relation to the slot 17, whereby further regulation within the set flow interval is achieved.

In the chamber 18 before the venturi 10 and after the regulating damper 11 and the orifice 12, the pressure is measured by the pressure sensor 6. This pressure sensor 6 is connected to the chamber 18 via a hole 19 and boring 20 in the valve housing 2.

Figure 2:
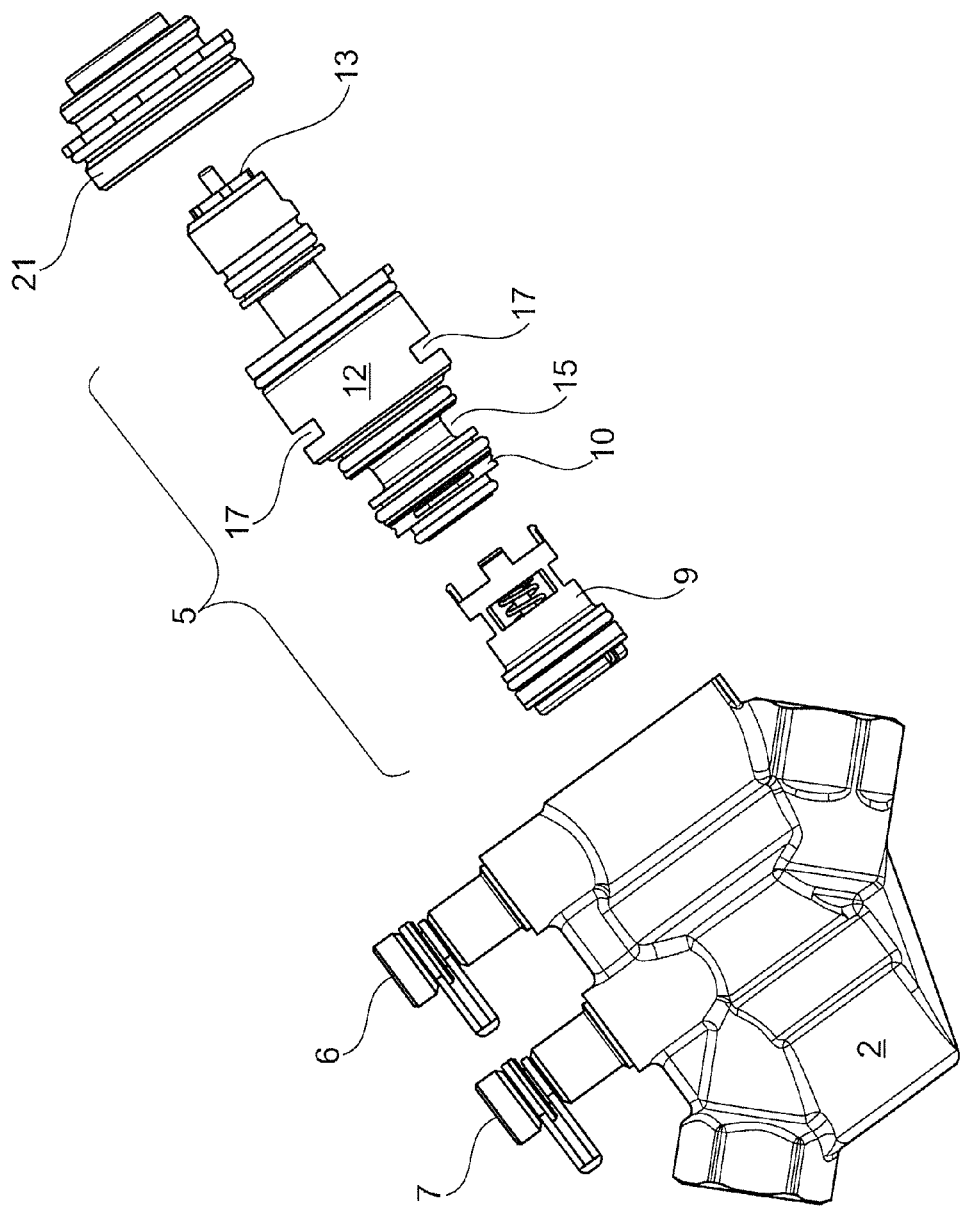
FIG. 2 shows a partially assembled valve insert and a valve housing.

In FIG. 2 is seen a valve housing 2 and partially assembled valve insert 5 consisting of a differential pressure regulator 9, a venturi 10 and an orifice 12 with a slot 17 in the side; internally of the orifice 12 is fitted a not visible regulating damper 11, and at the top a coupling member 13 for coupling with an actuator or other kind of moving mechanism. At the top, above the valve insert 5 is seen a nut 21 by which the valve insert 5 is secured in the correct position in the valve housing 2.

The invention claimed is:

1. A regulating valve used for dynamic regulation of fluid-borne systems, where a control valve is provided with a valve housing with an inlet and an outlet, where a modular valve insert with an orifice means is provided in the valve housing by which the flow in the regulating valve can be regulated, and where additionally there are detecting means for detecting either supply pressure or discharge pressure and another pressure, respectively, wherein the modular valve insert is comprised of at least a differential pressure regulator module, a venturi module, and a coupling member module for an actuator, where the modules are made with interacting joining means.

2. Regulating valve according to claim 1, wherein the valve housing of the regulating valve is provided with an inlet communicating with more than one opening in the valve insert, where these openings are distributed around the periphery of the valve insert.

3. Regulating valve according to claim 1, wherein the orifice means is provided with a pre-settable opening by which the maximum flow in the orifice means is regulated.

4. Regulating valve according to claim 1, wherein the venturi module of the modular valve insert is provided with one or more openings that communicate with the detecting means for detecting a fluid pressure for direct flow measurement.

5. Regulating valve according to claim 1, wherein the valve insert is made of one or more different plastic materials.

6. Regulating valve according to claim 1, wherein the modules of the valve insert are each provided with its own identification.

7. Regulating valve according to claim 6, wherein the identification comprises at least one of a color code and an RFID-tag.

8. Regulating valve according to claim 5, wherein said plastic materials comprise Polyphenylene Sulfide (PPS) or Polyphthalamide (PPA).

* * * * *